(No Model.)
W. L. PENNEY & T. LITTLE.
UNDERGROUND ELECTRIC WIRE CONDUIT.
No. 399,343. Patented Mar. 12, 1889.
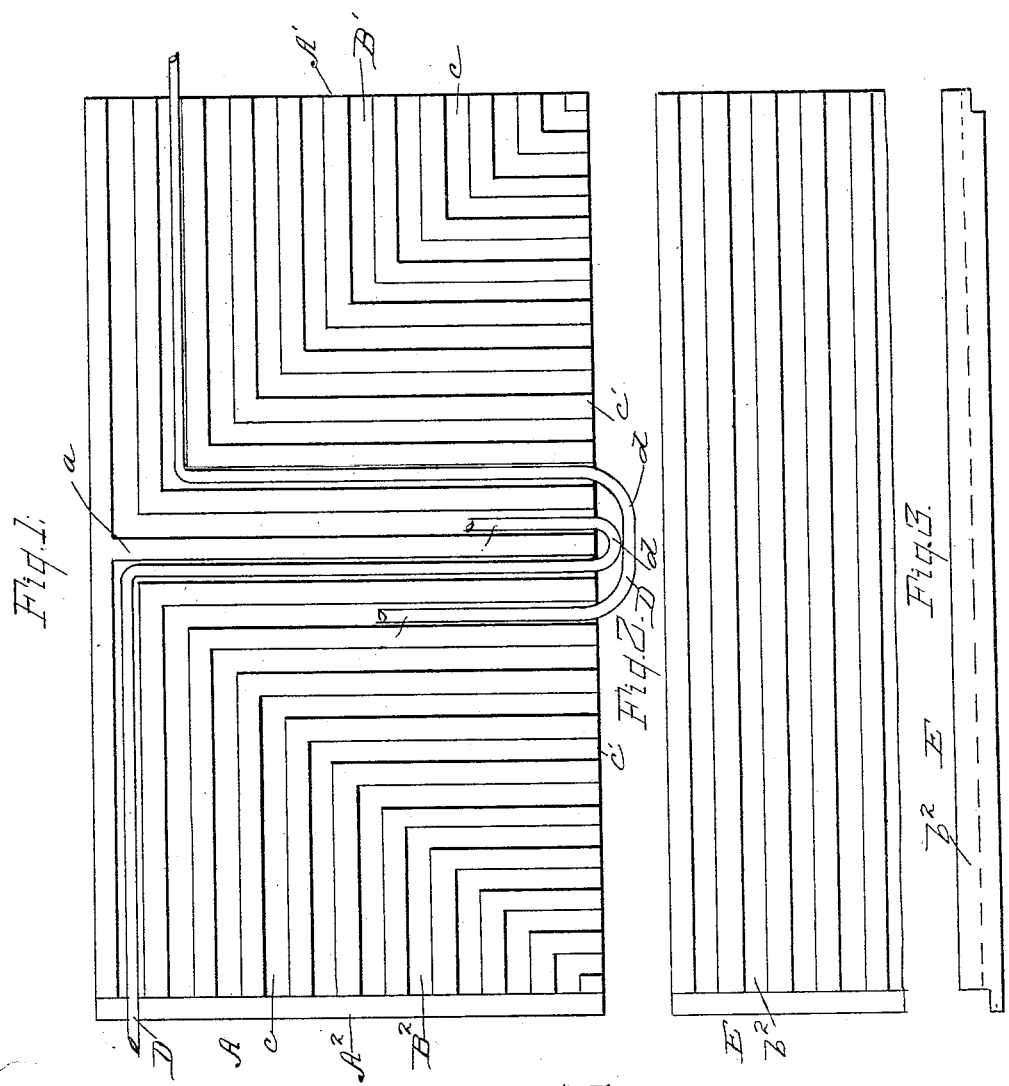
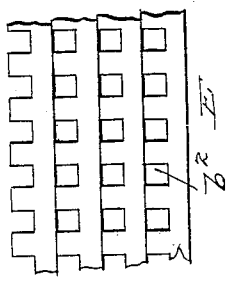

UNITED STATES PATENT OFFICE.

WILLIAM L. PENNEY AND THOMAS LITTLE, OF PITTSBURG, PENNSYLVANIA.

UNDERGROUND ELECTRIC-WIRE CONDUIT.

SPECIFICATION forming part of Letters Patent No. 399,343, dated March 12, 1889.

Application filed January 16, 1888. Serial No. 260,914. (No model.)

*To all whom it may concern:*

Be it known that we, WILLIAM L. PENNEY, M. D., and THOMAS LITTLE, of Pittsburg, Pennsylvania, have invented a new and useful Improvement in Underground Electric-Wire Conduits, which improvement is fully set forth in the following specification, reference being had to the accompanying drawings.

Similar letters of reference indicate corresponding parts.

Our invention relates to underground conduits for telegraph, telephone, and electric-light wires; and it consists of the peculiar construction and arrangement of parts, as will be hereinafter fully described and claimed.

In the accompanying drawings, Figure 1 is a plan or top view of one of our plates or sections for underground conduits. Fig. 2 is a corresponding view of another form of section, and Fig. 3 is an edge view of the plate shown in Fig. 2. Fig. 4 is an end view of a series of plates superimposed one upon the other to illustrate the manner of laying the sections to make the conduit.

Referring to the drawings, in which like letters of reference denote corresponding parts in all the figures, A designates a section or plate for underground conduits for telegraph, telephone, and electric-light wires which is constructed in accordance with our invention. This plate is divided by a central transverse rib or flange, $a$, into two sections or ends, $A'$ $A^2$, and on opposite sides of this central flange is formed two series of right-angled grooves, $B'$ $B^2$, respectively, the series of grooves $B'$ being formed in the same face of the section or end of the plate $A'$ as the grooves $B^2$ of the end $A^2$, as clearly shown in Fig. 1. One end of the longitudinal member of each series of grooves $B'$ $B^2$ opens through the opposite ends of the plate A, as at $c$, while the other ends of the transverse members of the two series of grooves open through one of the side edges of said plate, as at $c'$. The first wire, D, that is laid enters the longitudinal member of the first groove of the series $B'$ at one end of the plate A, then passes down the transverse member of the first groove $B'$ beyond the side edge, $c'$, of the plate, then into the transverse member of the first groove of the series $B^2$ that lies parallel with the transverse member of the grooves $B'$ from which it emerged, and finally out of the longitudinal member of said groove $B^2$ at the opposite end of the plate A, thus forming a loop, $d$, which projects laterally from the side edge, $c'$, of the plate. All of the series of wires are laid in this manner to provide a series of lateral loops, $d$, and thus permit of ready access to any one of the series of wires, whereby the current of any given wire can be conveniently switched off without disturbing the other wires, or connections made with any wire to lead laterally from the conduit into a dwelling or other place, the wire removed, &c.

In laying a straight conduit we employ a flat rectangular plate, E, (shown in Figs. 2 and 3,) which has a series of straight parallel grooves, $b^2$, formed longitudinally therein, and the plate A is laid at suitable intervals, with the longitudinal members of the series of grooves $B'$ $B^2$ therein in line with the grooves $b^2$ to form a continuous channel for the wires. After the first series of plates A E have been laid end to end for a suitable distance and the wires placed therein another series of plates are placed upon them to cover the grooves and wires therein, as indicated in Fig. 4.

We are aware that it has been proposed in the construction of underground conduits for electric wires to provide a plate at the junction of several conduits, having grooves on one face thereof extending across each corner of said plate for the purpose of connecting the grooves of a plate in one conduit with the grooves of a similar plate in another conduit at right angles to the first. With such construction the edges of the connecting-plate abut against and make close contact with the plates of the conduits, so that wires pass from one conduit, through the grooves in the plate, and directly into and through the other conduit at right angles thereto. We make no claim to such construction; but,

Having thus described our invention, what we claim as new, and desire to secure by Letters Patent, is—

The combination, with an underground conduit for electric wires, of a plate of sufficient size to fit wholly within said conduit, said plate being provided on its face at opposite sides of its center with right-angle grooves, one branch of each groove being in line with the interior of the conduit and the other 5 branch of each groove extending at right angles thereto to the longitudinal edge of the plate, whereby a conductor extending through the conduit may pass through a right-angle groove at each side of the center of the plate, 10 and thus expose a portion of said conductor beyond the edge of said grooved plate, substantially as set forth.

In testimony that we claim the foregoing as our invention we hereto set our hands in presence of two witnesses.

WILLIAM L. PENNEY.
THOMAS LITTLE.

Witnesses:
JOHN H. CRATTY,
WILLIAM M. STEVENSON.